United States Patent
Chang et al.

(10) Patent No.: US 12,237,851 B2
(45) Date of Patent: Feb. 25, 2025

(54) SWITCHING CIRCUIT AND METHOD OF PROVIDING SWITCHING CIRCUIT

(71) Applicant: Industrial Technology Research Institute, Hsinchu (TW)

(72) Inventors: Yu-Teng Chang, New Taipei (TW); Yu-Cheng Hsu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 306 days.

(21) Appl. No.: 18/082,594

(22) Filed: Dec. 16, 2022

(65) Prior Publication Data

US 2024/0154632 A1    May 9, 2024

(30) Foreign Application Priority Data

Nov. 3, 2022  (TW) .................................. 111142079

(51) Int. Cl.
*H04B 1/00* (2006.01)
*H04B 1/04* (2006.01)

(52) U.S. Cl.
CPC ......... *H04B 1/0078* (2013.01); *H04B 1/0483* (2013.01); *H04B 2001/0408* (2013.01)

(58) Field of Classification Search
CPC .. H03G 1/0088; H03G 1/0029; H03G 3/3042; H03G 5/28; H03G 3/30;
(Continued)

(56) References Cited

U.S. PATENT DOCUMENTS 6,900,695 B2    5/2005   Ouacha
7,254,371 B2    8/2007   Inui et al.
(Continued)

FOREIGN PATENT DOCUMENTS

CN   114598267         6/2022
TW   I618348           3/2018
WO   WO-2006053506 A1 * 5/2006   ............. H03F 1/526

OTHER PUBLICATIONS

Moon-Kyu Cho et al., "An Active Bi-Directional SiGe DPDT Switch With Multi-Octave Bandwidth", IEEE Microwave and Wireless Components Letters, Mar. 9, 2016, pp. 279-281.
(Continued)

*Primary Examiner* — Golam Sorowar
(74) *Attorney, Agent, or Firm* — JCIPRNET

(57) ABSTRACT

A switching circuit and a method of providing the switching circuit are provided. The switching circuit includes a first transmission amplifier, a second transmission amplifier, a third transmission amplifier, and a fourth transmission amplifier. The first transmission amplifier amplifies a first signal at a first connection port and transmits the first signal to a second connection port in a first mode. The second transmission amplifier amplifies a second signal at a third connection port and transmits the second signal to a fourth connection port in the first mode. The third transmission amplifier amplifies the first signal at the first connection port and transmits the first signal to the fourth connection port in the second mode. The fourth transmission amplifier amplifies the second signal at the third connection port and transmits the second signal to the second connection port in the second mode.

20 Claims, 9 Drawing Sheets

(58) Field of Classification Search
CPC .......... H03G 2201/103; H03G 5/165; H03G 2201/106; H03G 3/3036; H03G 1/02; H03G 3/20; H03G 3/3005; H03G 3/3031; H03G 3/3052; H03G 1/0017; H03G 1/0023; H03G 1/007; H03G 2201/307; H03G 3/004; H03G 3/18; H03F 2200/451; H03F 3/72; H03F 3/211; H03F 3/45179; H03F 3/195; H03F 3/45183; H03F 1/565; H03F 3/45475; H03F 1/223; H03F 2200/294; H03F 3/245; H03F 3/19; H03F 3/193; H03F 2200/387; H03F 3/68; H03F 2200/411; H03F 1/0211; H03F 2200/111; H03F 1/26; H04B 1/44; H04B 1/48; H04B 1/16; H04B 1/04; H04B 1/0458; H04B 1/18; H04B 1/0483; H04B 1/40; H04B 2001/045; H04B 1/406; H04B 2001/0408; H04B 1/006; H04B 1/0475; H04B 1/161

See application file for complete search history.

(56) References Cited

U.S. PATENT DOCUMENTS

| | | | |
|---|---|---|---|
| 9,985,357 | B2 | 5/2018 | Perumana et al. |
| 10,256,865 | B2 | 4/2019 | Perumana et al. |
| 11,356,134 | B1* | 6/2022 | Billsberry ............... H03F 3/245 |
| 2007/0117523 | A1 | 5/2007 | Weber et al. |
| 2008/0136554 | A1* | 6/2008 | He ........................ H03F 1/526 333/101 |
| 2011/0304388 | A1 | 12/2011 | Yamawaki et al. |
| 2020/0112286 | A1* | 4/2020 | Chakraborty ......... H03F 1/0277 |
| 2021/0250054 | A1 | 8/2021 | Tanaka et al. |
| 2021/0297045 | A1* | 9/2021 | Yamauchi ................. H03F 3/68 |
| 2024/0120886 | A1* | 4/2024 | Jee ......................... H03F 1/565 |
| 2024/0322770 | A1* | 9/2024 | Moon ..................... H03F 3/245 |

OTHER PUBLICATIONS

Ckhyun Song et al., "A SiGe-BiCMOS Wideband (2-22 GHZ) Active Power Divider/Combiner Circuit Supporting Bidirectional Operation", IEEE Transactions on Microwave Theory and Techniques, Nov. 18, 2016, pp. 4676-4684.

Moon-Kyu Cho et al., "A Two-Way Wideband Active SiGe BiCMOS Power Divider/Combiner for Reconfigurable Phased Arrays With Controllable Beam Width", IEEE Access, Dec. 27, 2019, pp. 2578-2589.

Yu-Teng Chang et al., "Wideband Reconfigurable Power Divider/ Combiner in 40-nm CMOS for 5G mmW Beamforming System", IEEE Transactions on Microwave Theory and Techniques, Feb. 2022, pp. 1410-1422.

Wonho Lee et al., "Small-Size Low-Loss 28-GHz Body-Floated CMOS DPDT Switch Using Shared Matching Network", IEEE Microwave and Wireless Components Letters, Oct. 21, 2018, pp. 1113-1115.

Yunyi Gong et al., "A bi-directional, X-band 6-Bit phase shifter for phased array antennas using an active DPDT switch", 2017 IEEE Radio Frequency Integrated Circuits Symposium, Jun. 2017, pp. 288-291.

Moon-Kyu Cho et al., "A SiGe-BiCMOS Wideband Active Bidirectional Digital Step Attenuator With Bandwidth Tuning and Equalization", IEEE Transactions on Microwave Theory and Techniques, May 8, 2018, pp. 3866-3876.

"Office Action of Taiwan Counterpart Application", issued on Jun. 9, 2023, p. 1-p. 7.

* cited by examiner

SWITCHING CIRCUIT AND METHOD OF PROVIDING SWITCHING CIRCUIT

CROSS-REFERENCE TO RELATED APPLICATION

This application claims the priority benefit of Taiwan application serial no. 111142079 filed on Nov. 3, 2022. The entirety of the above-mentioned patent application is hereby incorporated by reference herein and made a part of this specification.

TECHNICAL FIELD

The disclosure relates to a circuit and a method of providing a circuit, and in particular relates to a switching circuit and a method of providing a switching circuit.

BACKGROUND

Generally, switching circuits are used for various bidirectional transmissions of radio frequency signals. For example, the switching circuit may be implemented by a quadrature coupler. However, the current switching circuit itself introduces additional insertion loss, resulting in a reduction in the transmitter of output power. Moreover, the loss of the switching circuit itself also causes the signal-to-noise ratio (SNR) of the receiver to be reduced. It may be seen that how to provide a switching circuit with a high signal-to-noise ratio is one of the research focuses of those skilled in the art.

SUMMARY

The disclosure provides a switching circuit having a high signal-to-noise ratio and a method of providing the switching circuit.

The switching circuit of this disclosure includes a first transmission amplifier, a second transmission amplifier, a third transmission amplifier, and a fourth transmission amplifier. The first transmission amplifier is coupled between a first connection port and a second connection port. The second transmission amplifier is coupled between a third connection port and a fourth connection port. The third transmission amplifier is coupled between the first connection port and the fourth connection port. The fourth transmission amplifier is coupled between the second connection port and the third connection port. Among multiple modes, when operating in a first mode, the first transmission amplifier amplifies a first signal and transmits the first signal to the second connection port, and the second transmission amplifier amplifies a second signal and transmits the second signal to the fourth connection port. When operating in a second mode, the third transmission amplifier amplifies the first signal and transmits the first signal to the fourth connection port, and the fourth transmission amplifier amplifies the second signal and transmits the second signal to the second connection port.

The method of providing a switching circuit in this disclosure includes the following operation. A first transmission amplifier, a second transmission amplifier, a third transmission amplifier, and a fourth transmission amplifier are provided. The first transmission amplifier is coupled between a first connection port and a second connection port. The second transmission amplifier is coupled between a third connection port and a fourth connection port. The third transmission amplifier is coupled between the first connection port and the fourth connection port. The fourth transmission amplifier is coupled between the second connection port and the third connection port. One of the following amplifiers is controlled according to one of the multiple modes: the first transmission amplifier, the second transmission amplifier, the third transmission amplifier, and the fourth transmission amplifier, to provide an amplified signal, receive at least one signal, or transmit at least one signal.

Based on the above, the switching circuit may amplify multiple to-be-transmitted signals, thereby compensating for the transmission loss of the switching circuit itself. In this way, the switching circuit has low loss and the high signal-to-noise ratio.

In order to make the aforementioned features and advantages of the disclosure comprehensible, embodiments accompanied with drawings are described in detail below.

DETAILED DESCRIPTION OF DISCLOSED EMBODIMENTS

A portion of the embodiments of the disclosure will be described in detail with reference to the accompanying drawings. The element symbol referenced in the following description will be regarded as the same or similar element when the same element symbol appears in different drawings. These examples are only a portion of the disclosure and do not disclose all possible embodiments of the disclosure. More precisely, these embodiments are only examples within the scope of the patent application of the disclosure.

Figure 1:
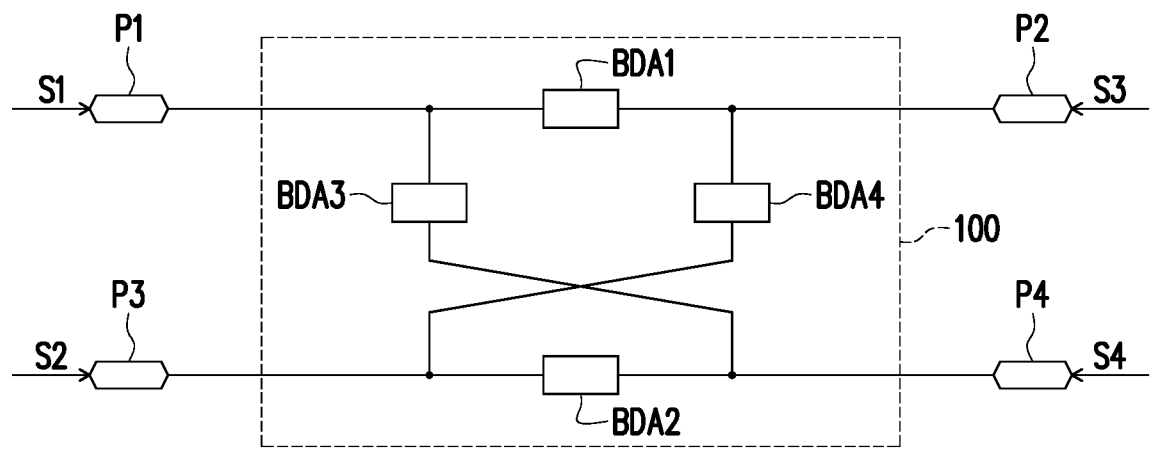
FIG. 1 is a schematic diagram of a switching circuit according to the first embodiment of the disclosure.

Referring to FIG. 1, FIG. 1 is a schematic diagram of a switching circuit according to the first embodiment of the disclosure. In this embodiment, the switching circuit 100 includes a first transmission amplifier BDA1, a second transmission amplifier BDA2, a third transmission amplifier BDA3, and a fourth transmission amplifier BDA4. The first transmission amplifier BDA1 is coupled between a connection port P1 and a connection port P2. The second transmission amplifier BDA2 is coupled between a connection port P3 and a connection port P4. The third transmission amplifier BDA3 is coupled between the connection port P1 and the connection port P4. The fourth transmission amplifier BDA4 is coupled between the connection port P2 and the connection port P3.

For example, the switching circuit 100 may be coupled to a first device (not shown) through the connection ports P1 and P3. The switching circuit 100 may be coupled to a second device (not shown) through the connection ports P2 and P4. Therefore, the switching circuit 100 may transmit the signals provided by the first device and the second device based on different modes.

In this embodiment, the first transmission amplifier BDA1, the second transmission amplifier BDA2, the third transmission amplifier BDA3, and the fourth transmission amplifier BDA4 may provide different signal transmission operations according to the different modes. The modes of this embodiment include a first mode, a second mode, a third mode, and a fourth mode (this disclosure is not limited thereto).

In the first mode, the first transmission amplifier BDA1 and the second transmission amplifier BDA2 are turned on. The first transmission amplifier BDA1 amplifies the first signal S1, and transmits the first signal S1 from the connection port P1 to the connection port P2. The second transmission amplifier BDA2 amplifies the second signal S2, and transmits the second signal S2 from the connection port P3 to the connection port P4. In addition, in the first mode, the third transmission amplifier BDA3 and the fourth transmission amplifier BDA4 are turned off for signal isolation.

In the second mode, the third transmission amplifier BDA3 and the fourth transmission amplifier BDA4 are turned on. The third transmission amplifier BDA3 amplifies the first signal S1, and transmits the first signal S1 from the connection port P1 to the connection port P4. The fourth transmission amplifier BDA4 amplifies the second signal S2, and transmits the second signal S2 from the connection port P3 to the connection port P2. In addition, in the second mode, the first transmission amplifier BDA1 and the second transmission amplifier BDA2 are turned off for signal isolation.

Incidentally, in the first mode and the second mode, the switching circuit 100 may provide amplified signals for the to-be-transmitted first signal S1 and second signal S2. The aforementioned amplifications compensate for the transmission loss of the switching circuit 100 itself. In this way, the switching circuit 100 may have a high signal-to-noise ratio.

In addition, the third transmission amplifier BDA3 and the fourth transmission amplifier BDA4 isolate signals other than the first signal S1 and the second signal S2 in the first mode. The first transmission amplifier BDA1 and the second transmission amplifier BDA2 isolate signals other than the first signal S1 and the second signal S2 in the second mode. In this way, the transmission noise of the switching circuit 100 may be reduced.

In the third mode, the first transmission amplifier BDA1 amplifies the third signal S3, and transmits the third signal S3 from the connection port P2 to the first connection port P1. The second transmission amplifier BDA2 amplifies the fourth signal S4, and transmits the fourth signal S4 from the connection port P4 to the connection port P3. In addition, in the third mode, the third transmission amplifier BDA3 and the fourth transmission amplifier BDA4 perform signal isolation.

In the fourth mode, the fourth transmission amplifier BDA4 amplifies the third signal S3 and transmits the third signal S3 from the connection port P2 to the connection port P3. The third transmission amplifier BDA3 amplifies the fourth signal S4, and transmits the fourth signal S4 from the connection port P4 to the connection port P1. In addition, in the fourth mode, the first transmission amplifier BDA1 and the second transmission amplifier BDA2 perform signal isolation. In the third mode and the fourth mode, the switching circuit 100 may provide amplified signals for the to-be-transmitted third signal S3 and fourth signal S4.

In this embodiment, the switching circuit 100 amplifies the received signal and performs corresponding signal isolation. Therefore, the switching circuit 100 may maintain good linearity of power output in different modes.

In this embodiment, the switching circuit 100 is, for example, suitable for the application field of remote control (e.g., remote control car, remote control aircraft, drone), and the application field of mobile communication of commercial terminals (e.g., GSM-WCDMA-LTE-5G, 6G, wireless LAN, low-orbit satellites, commercial base stations), military applications (e.g., radars, missiles, unmanned vehicles), and aerospace applications. In addition, the switching circuit 100 is suitable for architectures such as a phase array transceiver system. The switching circuit 100 may be used to switch the characteristics of an antenna array (e.g., left-hand and right-hand circular polarization, horizontal and vertical polarization) to improve communication transmission quality.

Figure 2:
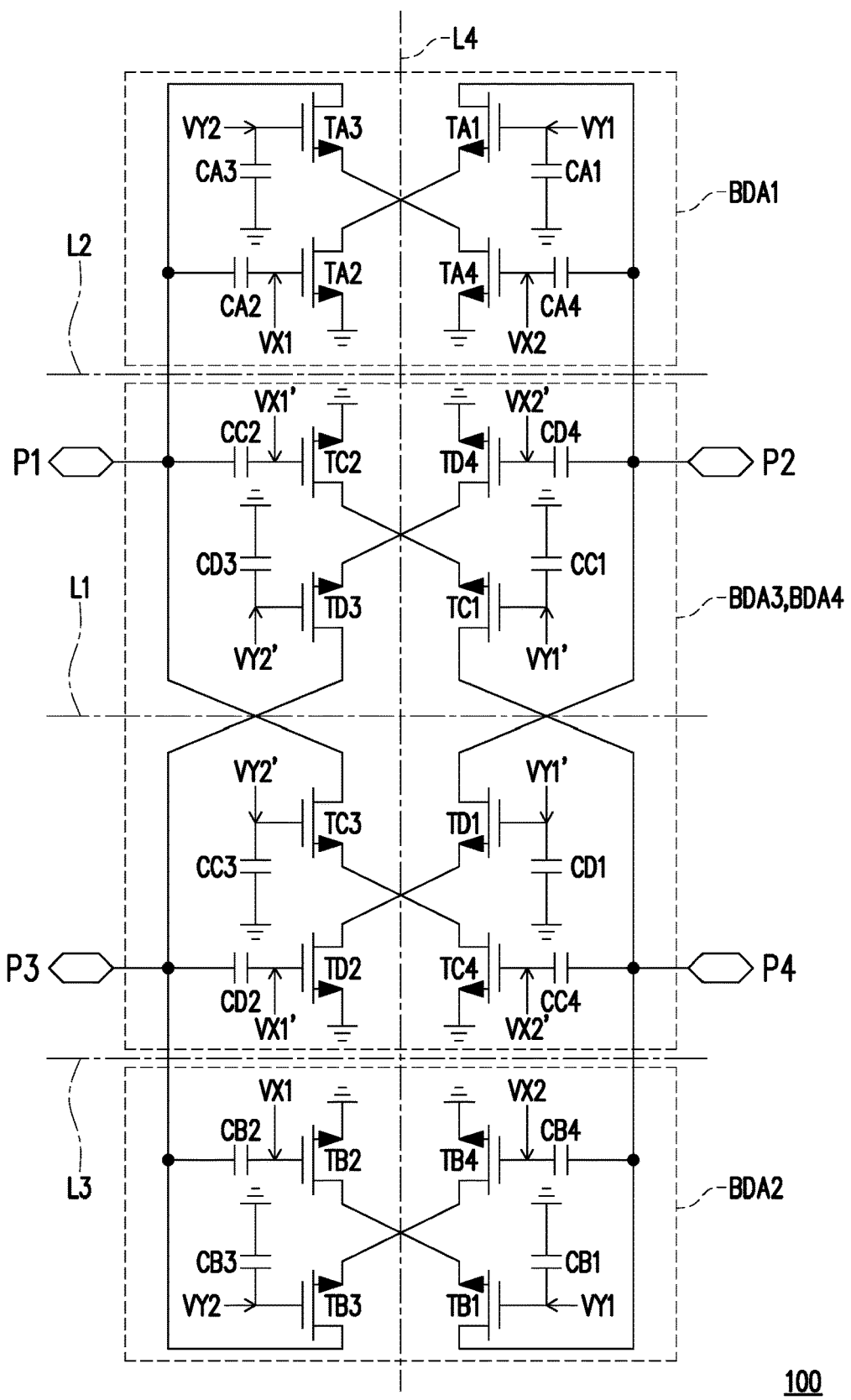
FIG. 2 is a circuit schematic diagram of a switching circuit according to the first embodiment of the disclosure.

Referring to FIG. 2, FIG. 2 is a circuit schematic diagram of a switching circuit according to the first embodiment of the disclosure. In this embodiment, the circuit configurations of the first transmission amplifier BDA1, the second transmission amplifier BDA2, the third transmission amplifier BDA3, and the fourth transmission amplifier BDA4 are further described. In this embodiment, the first transmission amplifier BDA1 includes transistors TA1 to TA4 and capacitors CA1 to CA4. The first terminal (e.g., the drain or collector) of the transistor TA1 is coupled to the connection port P2. The control terminal (e.g., the gate or base) of the transistor TA1 receives the control signal VY1. The capacitor CA1 is coupled between the control terminal of TA1 and a reference low voltage (e.g., the ground). The first terminal of the transistor TA2 is coupled to the second terminal (e.g., the source or emitter) of the transistor TA1. The second terminal of the transistor TA2 is coupled to the reference low voltage. The control terminal of the transistor TA2 receives the control signal VX1. The capacitor CA2 is coupled between the control terminal of the transistor TA2 and the connection port P1. The first terminal of the transistor TA3 is coupled to the connection port P1. The control terminal of the transistor TA3 receives the control signal VY2. The capacitor CA3 is coupled between the control terminal of the transistor TA3 and the reference low voltage. The first terminal of the transistor TA4 is coupled to the second terminal of the transistor TA3. The second terminal of the transistor TA4 is coupled to the reference low voltage. The control terminal of the transistor TA4 receives the control signal VX2. The capacitor CA4 is coupled between the control terminal of the transistor TA4 and the connection port P2.

The second transmission amplifier BDA2 includes transistors TB1 to TB4 and capacitors CB1 to CB4. The first terminal of the transistor TB1 is coupled to the connection port P4. The control terminal of the transistor TB1 receives the control signal VY1. The capacitor CB1 is coupled between the control terminal of the transistor TB1 and the reference low voltage. The first terminal of the transistor TB2 is coupled to the second terminal of the transistor TB1.

The second terminal of the transistor TB2 is coupled to the reference low voltage. The control terminal of the transistor TB2 receives the control signal VX1. The capacitor CB2 is coupled between the control terminal of the transistor TB2 and the connection port P3. The first terminal of the transistor TB3 is coupled to the connection port P3. The control terminal of the transistor TB3 receives the control signal VY2. The capacitor CB3 is coupled between the control terminal of the transistor TB3 and the reference low voltage. The first terminal of the transistor TB4 is coupled to the second terminal of the transistor TB3. The second terminal of the transistor TB4 is coupled to the reference low voltage. The control terminal of the transistor TB4 receives the control signal VX2. The capacitor CB4 is coupled between the control terminal of the transistor TB4 and the connection port P4.

The third transmission amplifier BDA3 includes transistors TC1 to TC4 and capacitors CC1 to CC4. The first terminal of the transistor TC1 is coupled to the connection port P4. The control terminal of the transistor TC1 receives the control signal VY1'. The capacitor CC1 is coupled between the control terminal of TC1 and the reference low voltage. The first terminal of the transistor TC2 is coupled to the second terminal of TC1. The second terminal of the transistor TC2 is coupled to the reference low voltage. The control terminal of the transistor TC2 receives the control signal VX1'. The capacitor CC2 is coupled between the control terminal of the transistor TC2 and the connection port P1. The first terminal of the transistor TC3 is coupled to the connection port P1. The control terminal of the transistor TC3 receives the control signal VY2'. The capacitor CC3 is coupled between the control terminal of the transistor TC3 and the reference low voltage. The first terminal of the transistor TC4 is coupled to the second terminal of the transistor TC3. The second terminal of the transistor TC4 is coupled to the reference low voltage. The control terminal of the transistor TC4 receives the control signal VX2'. The capacitor CC4 is coupled between the control terminal of the transistor TC4 and the connection port P4.

The fourth transmission amplifier BDA4 includes transistors TD1 to TD4 and capacitors CD1 to CD4. The first terminal of the transistor TD1 is coupled to the connection port P2. The control terminal of the transistor TD1 receives the control signal VY1'. The capacitor CD1 is coupled between the control terminal of TD1 and the reference low voltage. The first terminal of the transistor TD2 is coupled to the second terminal of TD1. The second terminal of the transistor TD2 is coupled to the reference low voltage. The control terminal of the transistor TD2 receives the control signal VX1'. The capacitor CD2 is coupled between the control terminal of the transistor TD2 and the connection port P3. The first terminal of the transistor TD3 is coupled to the connection port P3. The control terminal of the transistor TD3 receives the control signal VY2'. The capacitor CD3 is coupled between the control terminal of the transistor TD3 and the reference low voltage. The first terminal of the transistor TD4 is coupled to the second terminal of the transistor TD3. The second terminal of the transistor TD4 is coupled to the reference low voltage. The control terminal of the transistor TD4 receives the control signal VX2'. The capacitor CD4 is coupled between the control terminal of the transistor TD4 and the connection port P2.

It should be noted that, in this embodiment, the circuit layout of the first transmission amplifier BDA1 and the circuit layout of the second transmission amplifier BDA2 present line symmetry. Furthermore, the transistors TA1 to TA4 and the capacitors CA1 to CA4 are implemented by the first design layout. The transistors TB1 to TB4 and the capacitors CB1 to CB4 are implemented by the second design layout. Based on the symmetrical center line L1, the first design layout and the second design layout present a first line symmetry. The circuit layout of the third transmission amplifier BDA3 and the circuit layout of the fourth transmission amplifier BDA4 present line symmetry. Furthermore, the transistors TC1 to TC4 and the capacitors CC1 to CC4 are implemented by the third design layout. The transistors TD1 to TD4 and the capacitors CD1 to CD4 are implemented by the fourth design layout. Based on the symmetrical center line L1, the third design layout and the fourth design layout present the first line symmetry. Based on the aforementioned line symmetrical circuit layout, the layout of the switching circuit 100 may be further simplified.

The transistors TC1, TC2, TD1, and TD2 and the capacitors CC1, CC2, CD1, and CD2 are implemented by the fifth design layout. Based on the symmetrical center line L2, the first design layout and the fifth design layout present a second line symmetry. The transistors TC3, TC4, TD3, and TD4 and the capacitors CC3, CC4, CD3, and CD4 are implemented by the sixth design layout. Based on the symmetrical center line L3, the second design layout and the sixth design layout present a third line symmetry. In addition, the switching circuit 100 presents a fourth line symmetry (i.e., left-right symmetry) based on the symmetrical center line L4.

Referring to FIG. 1 and FIG. 2 at the same time, taking the first transmission amplifier BDA1 as an example, the transistors TA1 and TA2 form a first cascode circuit. The transistors TA3 and TA4 form a second cascode circuit. The first cascode circuit and the second cascode circuit are interleaved with each other. In the first mode, the transistors TA1 and TA2 are turned on. The transistors TA3 and TA4 are turned off. Therefore, the first cascode circuit actively provides an amplified signal for the first signal S1. In the third mode, the transistors TA3 and TA4 are turned on, and the transistors TA1 and TA2 are turned off. Therefore, the second cascode circuit actively provides an amplified signal for the third signal S3. In addition, in the second mode and the fourth mode, at least the transistors TA2 and TA4 are turned off. That is to say, both the first cascode circuit and the second cascode circuit are turned off. Therefore, the first transmission amplifier BDA1 performs signal isolation between the connection ports P1 and P2.

Taking the second transmission amplifier BDA2 as an example, the cascode circuit formed by the transistors TB1 and TB2 and the cascode circuit formed by the transistors TB3 and TB4 are interleaved with each other. In the first mode, the transistors TB1 and TB2 are turned on. The transistors TB3 and TB4 are turned off. Therefore, the cascode circuit formed by the transistors TB1 and TB2 actively provides an amplified signal for the second signal S2. In the third mode, the transistors TB3 and TB4 are turned on, and the transistors TB1 and TB2 are turned off. Therefore, the cascode circuit formed by the transistors TB3 and TB4 will actively provides an amplified signal for the fourth signal S4. In addition, in the second mode and the fourth mode, at least the transistors TB2 and TB4 are turned off. That is to say, the cascode circuit formed by the transistors TB1 and TB2, and the cascode circuit formed by the transistors TB3 and TB4 are all turned off. Therefore, the second transmission amplifier BDA2 performs signal isolation between the connection ports P3 and P4.

Taking the third transmission amplifier BDA3 as an example, the cascode circuit formed by the transistors TC1 and TC2 is roughly parallel to the cascode circuit formed by the transistors TC3 and TC4. In the second mode, the transistors TC1 and TC2 are turned on. The transistors TC3 and TC4 are turned off. Therefore, the cascode circuit formed by the transistors TC1 and TC2 actively provides an amplified signal for the first signal S1. In the fourth mode, the transistors TC3 and TC4 are turned on, and the transistors TC1 and TC2 are turned off. Therefore, the cascode circuit formed by the transistors TC3 and TC4 actively provides an amplified signal for the fourth signal S4. In addition, in the first mode and the third mode, at least the transistors TC2 and TC4 are turned off. That is to say, the cascode circuit formed by the transistors TC1 and TC2, and the cascode circuit formed by the transistors TC3 and TC4 are all turned off. Therefore, the third transmission amplifier BDA3 performs signal isolation between the connection ports P1 and P4.

Taking the fourth transmission amplifier BDA4 as an example, the cascode circuit formed by the transistors TD1 and TD2 is roughly parallel to the cascode circuit formed by the transistors TD3 and TD4. In the second mode, the transistors TD1 and TD2 are turned on. The transistors TD3 and TD4 are turned off. Therefore, the cascode circuit formed by the transistors TD1 and TD2 actively provides an amplified signal for the second signal S2. In the fourth mode, transistors TD3 and TD4 are turned on and the transistors TD1 and TD2 are turned off. Therefore, the cascode circuit formed by the transistors TD3 and TD4 actively provides an amplified signal for the third signal S3. In addition, in the first mode and the third mode, at least the transistors TD2 and TD4 are turned off. That is to say, the cascode circuit formed by the transistors TD1 and TD2, and the cascode circuit formed by the transistors TD3 and TD4 are all turned off. Therefore, the fourth transmission amplifier BDA4 performs signal isolation between the connection ports P2 and P3.

The transistors TA1 to TA4, TB1 to TB4, TC1 to TC4, and TD1 to TD4 are respectively implemented by N-type field-effect transistors (FETs) or NPN-type bipolar transistors (BJTs). In this embodiment, the transistors TA1 to TA4, TB1 to TB4, TC1 to TC4, and TD1 to TD4 are respectively exemplified by NMOS field effect transistors.

Figure 3:
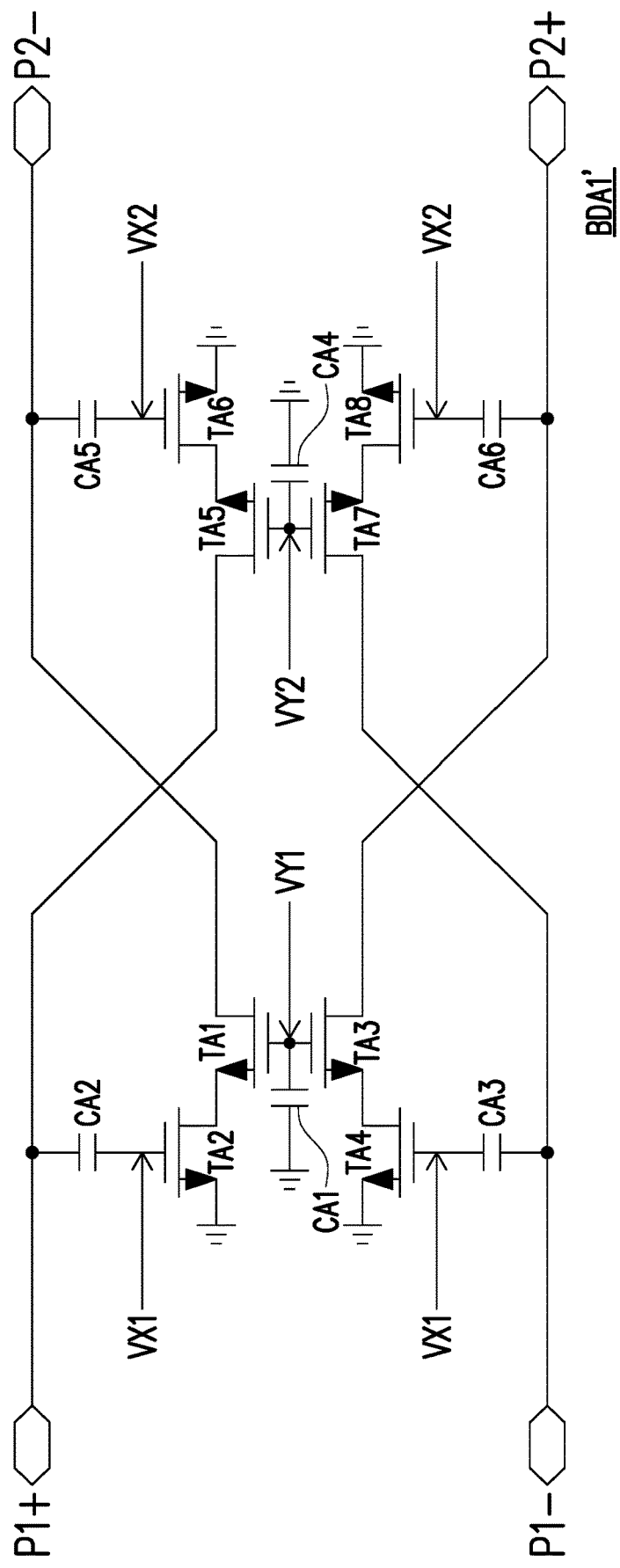
FIG. 3 is a circuit schematic diagram of a first transmission amplifier according to an embodiment of the disclosure.

Referring to FIG. 3, FIG. 3 is a circuit schematic diagram of a first transmission amplifier according to an embodiment of the disclosure. The first transmission amplifier BDA1' is suitable for transmitting differential signals. In this embodiment, the connection port P1 includes a first differential signal terminal P1+ and a second differential signal terminal P1−. The connection port P2 includes a third differential signal terminal P2− and a fourth differential signal terminal P2+. In this embodiment, the first transmission amplifier BDA1' includes transistors TA1 to TA8 and capacitors CA1 to CA6.

The first terminal of the transistor TA1 is coupled to the third differential signal terminal P2−. The control terminal of the transistor TA1 receives the first control signal VY1. The capacitor CA1 is coupled between the control terminal of the transistor TA1 and the reference low voltage. The first terminal of the transistor TA2 is coupled to the second terminal of the transistor TA1. The second terminal of the transistor TA2 is coupled to the reference low voltage. The control terminal of the transistor TA2 receives the second control signal VX1. The capacitor CA2 is coupled between the control terminal of the transistor TA2 and the first differential signal terminal P1+. The first terminal of the transistor TA3 is coupled to the fourth differential signal terminal P2+. The control terminal of the transistor TA3 receives the first control signal VY1. The first terminal of the transistor TA4 is coupled to the second terminal of the transistor TA3. The second terminal of the transistor TA4 is coupled to the reference low voltage. The control terminal of the transistor TA4 receives the second control signal VX1. The capacitor CA3 is coupled between the control terminal of the transistor TA4 and the second differential signal terminal P1−. The first terminal of the transistor TA5 is coupled to the first differential signal terminal P1+. The control terminal of the transistor TA5 receives the third control signal VY2. The capacitor CA4 is coupled between the control terminal of the transistor TA5 and the reference low voltage. The first terminal of the transistor TA6 is coupled to the second terminal of the transistor TA5. The second terminal of the transistor TA6 is coupled to the reference low voltage. The control terminal of the transistor TA6 receives the fourth control signal VX2. The capacitor CA5 is coupled between the control terminal of the transistor TA6 and the third differential signal terminal P2−. The first terminal of the transistor TA7 is coupled to the second differential signal terminal P1−. The control terminal of the transistor TA7 receives the third control signal VY2. The first terminal of the transistor TA8 is coupled to the second terminal of the transistor TA7. The second terminal of the transistor TA8 is coupled to the reference low voltage. The control terminal of the transistor TA8 receives the fourth control signal VX2. The capacitor CA6 is coupled between the control terminal of the transistor TA8 and the fourth differential signal terminal P2+.

In this embodiment, the transistors TA1 and TA2 form a first cascode circuit. The transistors TA3 and TA4 form a second cascode circuit. The transistors TA5 and TA6 form a third cascode circuit. The transistors TA7 and TA8 form a fourth cascode circuit. In the first mode, the transistors TA1 to TA4 are turned on. The first cascode circuit amplifies the signal at the first differential signal terminal P1+. The second cascode circuit amplifies the signal at the second differential signal terminal P1−. The transistors TA5 to TA8 are turned off. In the third mode, the transistors TA5 to TA8 are turned on. The third cascode circuit amplifies the signal at the third differential signal terminal P2−. The fourth cascode circuit amplifies the signal at the fourth differential signal terminal P2+. The transistors TA1 to TA4 are turned off. In addition, in the second mode and the fourth mode, at least the transistors TA2, TA4, TA6, and TA8 are all turned off.

Figure 4:
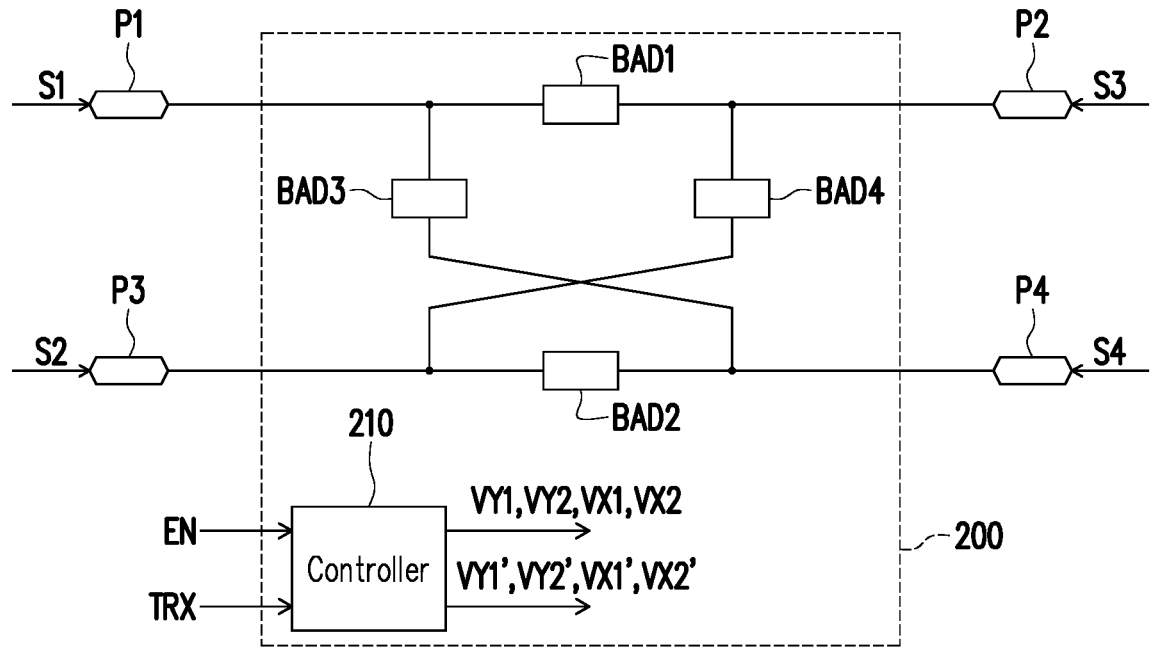
FIG. 4 is a schematic diagram of a switching circuit according to the second embodiment of the disclosure.

Referring to FIG. 4, FIG. 4 is a schematic diagram of a switching circuit according to the second embodiment of the disclosure. In this embodiment, the switching circuit 200 includes a first transmission amplifier BDA1, a second transmission amplifier BDA2, a third transmission amplifier BDA3, a fourth transmission amplifier BDA4, and a controller 210. The implementations of the first transmission amplifier BDA1, the second transmission amplifier BDA2, the third transmission amplifier BDA3, and the fourth transmission amplifier BDA4 have been clearly described in the embodiments shown in FIG. 1 to FIG. 3, so they are not repeated herein.

In this embodiment, the controller 210 is coupled to the first transmission amplifier BDA1, the second transmission amplifier BDA2, the third transmission amplifier BDA3, and the fourth transmission amplifier BDA4. The controller 210 provides control signals VY1, VY2, VX1, VX2, VY1', VY2', VX1', and VX2' according to the transmission setting signal TRX and the enabling signal EN. The controller 210 uses the control signals VY1, VY2, VX1, VX2, VY1', VY2', VX1', and VX2' to control the first transmission amplifier BDA1, the second transmission amplifier BDA2, the third transmission amplifier BDA3, and the fourth transmission amplifier BDA4 to operate in one of the multiple modes.

In this embodiment, the transmission setting signal TRX and the enabling signal EN are respectively from mode setting signals outside the switching circuit 200.

Specifically, referring to FIG. 4 and Table 1 at the same time, Table 1 is a truth table of the transmission setting signal TRX, the enabling signal EN, and the multiple modes.

TABLE 1

| TRX | EN | Mode | Transmission direction of BDA1 | Transmission direction of BDA2 | Transmission direction of BDA3 | Transmission direction of BDA4 |
|---|---|---|---|---|---|---|
| 0 | 0 | First mode | P1→P2 | P3→P4 | Isolated | Isolated |
| 0 | 1 | Second mode | Isolated | Isolated | P1→P4 | P3→P2 |
| 1 | 0 | Third mode | P2→P1 | P4→P3 | Isolated | Isolated |
| 1 | 1 | Fourth mode | Isolated | Isolated | P4→P1 | P2→P3 |

In response to the transmission setting signal TRX having the first logic level (e.g., the low logic "0") and the enabling signal EN having the first logic level, the controller 210 controls the first transmission amplifier BDA1, the second transmission amplifier BDA2, the third transmission amplifier BDA3, and the fourth transmission amplifier BDA4 to operate in the first mode. In response to the transmission setting signal TRX having the first logic level and the enabling signal EN having the second logic level (e.g., the high logic "1"), the controller 210 controls the first transmission amplifier BDA1, the second transmission amplifier BDA2, the third transmission amplifier BDA3, and the fourth transmission amplifier BDA4 to operate in the second mode. In response to the transmission setting signal TRX having the second logic level and the enabling signal EN having the first logic level, the controller 210 controls the first transmission amplifier BDA1, the second transmission amplifier BDA2, the third transmission amplifier BDA3, and the fourth transmission amplifier BDA4 to operate in the third mode. In addition, in response to the transmission setting signal TRX having the second logic level and the enabling signal EN having the second logic level, the controller 210 controls the first transmission amplifier BDA1, the second transmission amplifier BDA2, the third transmission amplifier BDA3, and the fourth transmission amplifier BDA4 to operate in the fourth mode.

The implementations of the first mode, the second mode, the third mode, and the fourth mode have been clearly described in the embodiments shown in FIG. 1 and FIG. 2, so they are not repeated herein.

Figure 5:
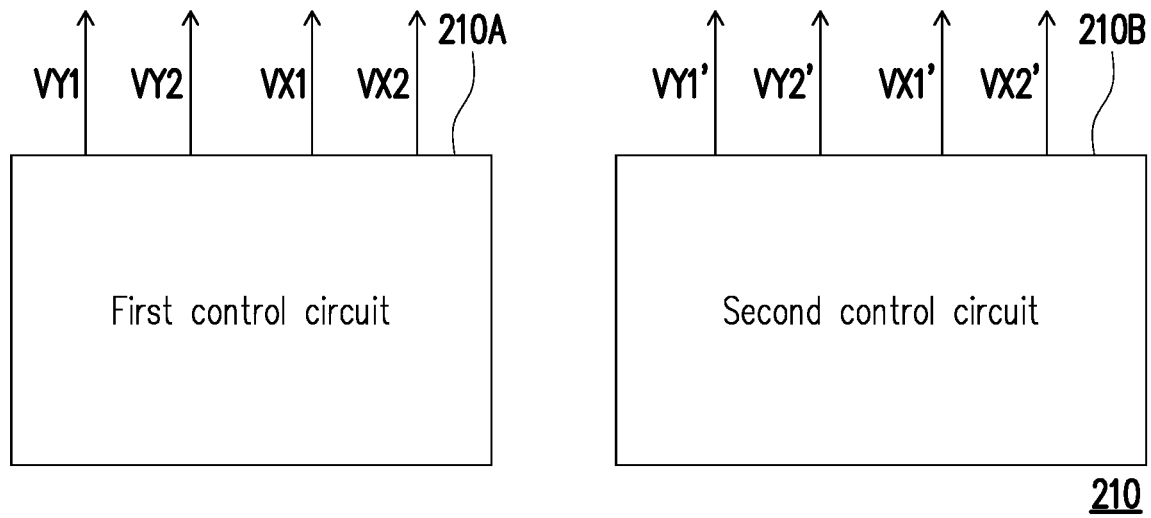
FIG. 5 is a schematic diagram of a controller according to the first embodiment of the disclosure.

Referring to FIG. 2 and FIG. 5 at the same time, FIG. 5 is a schematic diagram of a controller according to the first embodiment of the disclosure. In this embodiment, the controller 210 includes a first control circuit 210A and a second control circuit 210B. The first control circuit 210A is coupled to the first transmission amplifier BDA1 and the second transmission amplifier BDA2. The first control circuit 210A controls the first transmission amplifier BDA1 and the second transmission amplifier BDA2 according to the transmission setting signal TRX and the inverted enabling signal ENB. The first control circuit 210A provides control signals VY1, VY2, VX1, and VX2 according to the transmission setting signal TRX and the inverted enabling signal ENB. In response to the control signals VY1, VY2, VX1, and VX2, the first transmission amplifier BDA1 and the second transmission amplifier BDA2 are operated in one of the first mode, the second mode, the third mode, and the fourth mode.

The second control circuit 210B is coupled to the third transmission amplifier BDA3 and the fourth transmission amplifier BDA4. The second control circuit 210B controls the third transmission amplifier BDA3 and the fourth transmission amplifier BDA4 according to the transmission setting signal TRX and the enabling signal EN. The second control circuit 210B provides control signals VY1', VY2', VX1', and VX2' according to the transmission setting signal TRX and the enabling signal EN. In response to the control signals VY1', VY2', VX1', and VX2', the third transmission amplifier BDA3 and the fourth transmission amplifier BDA4 are operated in one of the first mode, the second mode, the third mode, and the fourth mode.

Figure 6A:
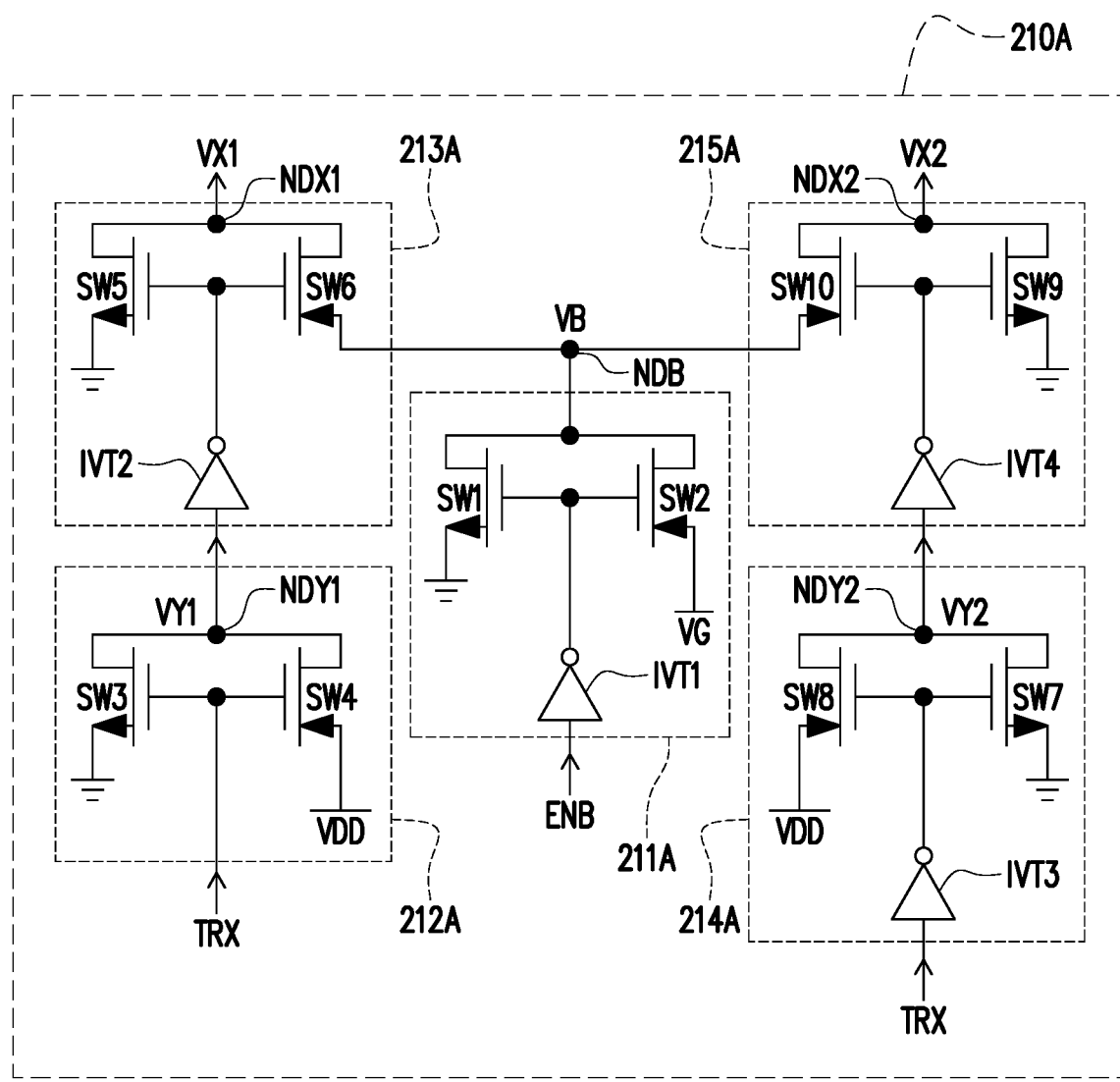
FIG. 6A is a circuit schematic diagram of a first control circuit according to an embodiment of the disclosure.

Referring to FIG. 6A, FIG. 6A is a circuit schematic diagram of a first control circuit according to an embodiment of the disclosure. In this embodiment, the first control circuit 210A includes a bias circuit 211A and control signal generators 212A to 215A. The bias circuit 211A receives the inverted enabling signal ENB. The bias circuit 211A responds to the inverted enabling signal ENB. When the inverted enabling signal ENB is at the first logic level, the bias signal VB has a low voltage. When the inverted enabling signal ENB is at the second logic level, the bias signal VB has a high voltage value.

The control signal generator 212A receives the transmission setting signal TRX. When the transmission setting signal TRX is at the first logic level, the control signal VY1 has a high voltage value. When the transmission setting signal TRX is at the second logic level, the control signal VY1 has a low voltage value. The control signal generator 213A is coupled to the control signal generator 212A and the bias circuit 211A. The control signal generator 213A responds to the logic level of the control signal VY1 to use one of the bias signal VB and the reference low voltage as the control signal VX1.

The control signal generator 214A receives the transmission setting signal TRX. When the transmission setting signal TRX is at the first logic level, the control signal VY2 has a low voltage value. When the transmission setting signal TRX is at the second logic level, the control signal VY2 has a high voltage value. The control signal generator 215A is coupled to the control signal generator 214A and the bias circuit 211A. The control signal generator 215A responds to the logic level of the control signal VY2 to use one of the bias signal VB and the reference low voltage as the control signal VX2.

In this embodiment, the bias circuit 211A includes an inverter IVT1 and switches SW1 and SW2. The input terminal of the inverter IVT1 receives the inverted enabling signal ENB. The second terminal of the switch SW1 is coupled to the reference low voltage. The first terminal of the switch SW1 is coupled to the bias node NDB. The control terminal of the switch SW1 is coupled to the output terminal of the inverter IVT1. The second terminal of the switch SW2 is coupled to the reference high voltage VG. A first terminal of the switch SW2 is coupled to the bias node NDB. The control terminal of the switch SW2 is coupled to the output terminal of the inverter IVT1.

The control signal generator 212A includes switches SW3 and SW4. The second terminal of the switch SW3 is coupled to the reference low voltage. The first terminal of the switch SW3 is coupled to the control node NDY1. The control terminal of the switch SW3 receives the transmission setting signal TRX. The second terminal of the switch SW4 is coupled to the reference high voltage VDD. The first terminal of the switch SW4 is coupled to the control node NDY1. The control terminal of the switch SW4 receives the transmission setting signal TRX. The control node NDY1 is used to output the control signal VY1.

The control signal generator 213A includes an inverter IVT2 and switches SW5 and SW6. The input terminal of the inverter IVT2 is coupled to the control node NDY1 to receive the control signal VY1. The second terminal of the switch SW5 is coupled to the reference low voltage. The first terminal of the switch SW5 is coupled to the control node NDX1. The control terminal of the switch SW5 is coupled to the output terminal of the inverter IVT2. The second terminal of the switch SW6 is coupled to the bias node NDB. The first terminal of the switch SW6 is coupled to the control node NDX1. The control terminal of the switch SW6 is coupled to the output terminal of the inverter IVT2. The control node NDX1 is used to output the control signal VX1.

The control signal generator 214A includes an inverter IVT3 and switches SW7 and SW8. The input terminal of the inverter IVT3 receives the transmission setting signal TRX. The second terminal of the switch SW7 is coupled to the reference low voltage. The first terminal of the switch SW7 is coupled to the control node NDY2. The control terminal of the switch SW7 is coupled to the output terminal of the inverter IVT3. The second terminal of the switch SW8 is coupled to the reference high voltage VDD. The first terminal of the switch SW8 is coupled to the control node NDY2. The control terminal of switch SW8 is coupled to the output terminal of inverter IVT3. The control node NDY2 is used to output the control signal VY2.

The control signal generator 215A includes an inverter IVT4 and switches SW9 and SW10. The input terminal of the inverter IVT4 is coupled to the control node NDY2 to receive the control signal VY2. The second terminal of the switch SW9 is coupled to the reference low voltage. The first terminal of the switch SW9 is coupled to the control node NDX2. The control terminal of the switch SW9 is coupled to the output terminal of the inverter IVT4. The second terminal of the switch SW10 is coupled to the bias node NDB. The first terminal of the switch SW10 is coupled to the control node NDX2. The control terminal of the switch SW10 is coupled to the output terminal of the inverter IVT4. The control node NDX2 is used to output the control signal VX2.

The switches SW1, SW3, SW5, SW7, and SW9 are respectively implemented by N-type field-effect transistors (FETs) or NPN-type bipolar transistors (BJTs). In this embodiment, the switches SW1, SW3, SW5, SW7, and SW9 are respectively exemplified by NMOS field effect transistors. The switches SW2, SW4, SW6, SW8, and SW10 are respectively implemented by P-type field-effect transistors or PNP-type bipolar transistors.

Figure 6B:
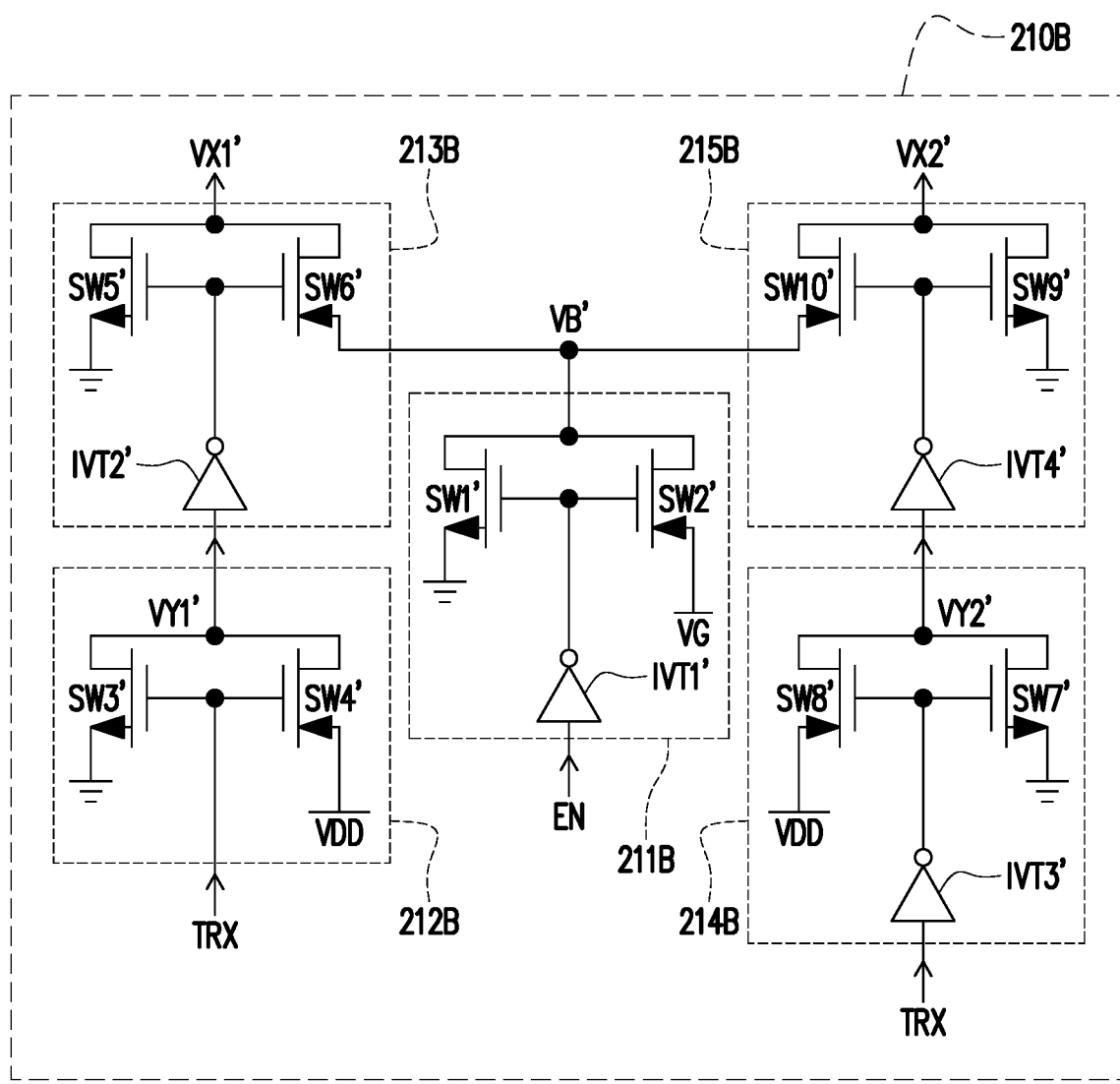
FIG. 6B is a circuit schematic diagram of a second control circuit according to an embodiment of the disclosure.

Referring to FIG. 6B, FIG. 6B is a circuit schematic diagram of a second control circuit according to an embodiment of the disclosure. In this embodiment, the second control circuit 210B includes a bias circuit 211B and control signal generators 212B to 215B. The bias circuit 211B includes an inverter IVT1' and switches SW1' and SW2'. The control signal generator 212B includes switches SW3' and SW4'. The control signal generator 213B includes an inverter IVT2' and switches SW5' and SW6'. The control signal generator 214B includes an inverter IVT3' and switches SW7' and SW8'. The control signal generator 215B includes an inverter IVT4' and switches SW9' and SW10'. The coupling between the inverters IVT1' to IVT4' and the switches SW1' to SW10' is the same as the coupling between the inverters IVT1 to IVT4 and the switches SW1 to SW10, so they are not repeated herein. Different from the first control circuit 210A, the bias circuit 211B receives the enabling signal EN.

Referring to FIG. 2, FIG. 6A, and Table 1 at the same time, in this embodiment, the operation of the first control circuit 210A is described by taking the first transmission amplifier BDA1 as an example. In the first mode, both the transmission setting signal TRX and the enabling signal EN are at the first logic level (i.e., low logic "0"). The inverted enabling signal ENB has a second logic level (i.e., high logic "1"). At this time, the switch SW2 is turned on, and the switch SW1 is turned off. Therefore, the voltage level of the bias signal VB is substantially equal to the bias level of the reference high voltage VG. At the same time, the switch SW4 is turned on and the switch SW3 is turned off. Therefore, the voltage level of the control signal VY1 is substantially equal to the high voltage level of the reference high voltage VDD. The switch SW6 is turned on due to the high voltage level of the control signal VY1, and the switch SW5 is turned off. Therefore, the voltage level of the control signal VX1 is substantially equal to the voltage level of the bias signal VB. The switch SW7 is turned on. The switch SW8 is turned off. Therefore, the voltage level of the control signal VY2 is substantially equal to the low voltage level of the reference low voltage. The switch SW9 is turned on in response to the low voltage level of the control signal VY2. The switch SW10 is turned off. Therefore, the voltage level of the control signal VX2 is substantially equal to the low voltage level of the reference low voltage.

In the first mode, the transistor TA1 is turned on in response to the high voltage level of the control signal VY1. The transistor TA2 is turned on in response to the bias level of the control signal VX1. The transistor TA3 is turned off in response to the low voltage level of the control signal VY2. The transistor TA4 is turned off in response to the low voltage level of the control signal VX2.

In the second mode, the transmission setting signal TRX is at a first logic level (i.e., low logic "0"), and the enabling signal EN is at a second logic level (i.e., high logic "1"). After the inverted enabling signal ENB has a first logic level (i.e., low logic "0"), the switch SW1 is turned on. The switch SW2 is turned off. Therefore, the voltage level of the bias signal VB is equal to the low voltage level. The switch SW4 is turned on. The switch SW3 is turned off. Therefore, the voltage level of the control signal VY1 is substantially equal to the high voltage level of the reference high voltage VDD. The switch SW5 is turned off in response to the high voltage level of the control signal VY1. The switch SW6 is turned off because the bias signal VB is at a low voltage level. Further, taking the switch SW6 as an example, the bias signal VB is at a low level. The voltage difference between the control terminal and the second terminal of the switch SW6 is substantially equal to 0 volts. The voltage difference between the control terminal and the second terminal of the switch SW6 is lower than the threshold voltage of the switch SW6. Therefore, the switch SW6 is turned off. In addition, the voltage difference between the first terminal and the second terminal of the switch SW6 is substantially equal to 0 volts. The second terminal of the switch SW5 is coupled to the reference low voltage. Therefore, based on the superposition theorem, the voltage level of the control signal VX1 is equal to the voltage division result of the bias signal VB by the switches SW5 and SW6 that are turned off. Therefore, the voltage level of the control signal VX1 is a low voltage level. The switch SW7 is turned on. The switch SW8 is turned off. Therefore, the voltage level of the control signal VY2 is substantially equal to the low voltage level of the reference low voltage. The switch SW9 is turned on in response to the low voltage level of the control signal VY2. The switch SW10 is turned off. Therefore, the voltage level of the control signal VX2 is substantially equal to the low voltage level of the reference low voltage.

In the second mode, the transistor TA1 is turned on in response to the high voltage level of the control signal VY1. The transistor TA2 is turned off in response to the low voltage level of the control signal VX1. The transistor TA3 is turned off in response to the low voltage level of the control signal VY2. The transistor TA4 is turned off in response to the low voltage level of the control signal VX2.

In the third mode, the transmission setting signal TRX is at a second logic level (i.e., high logic "1"), and the enabling signal EN has a first logic level (i.e., low logic "0"). The inverted enabling signal ENB is at a second logic level (i.e., high logic "1"). The switch SW1 is turned off. The switch SW2 is turned on. Therefore, the voltage level of the bias signal VB is substantially equal to the bias level of the reference high voltage VG. The switch SW3 is turned on. The switch SW4 is turned off. Therefore, the voltage level of the control signal VY1 is substantially equal to the low voltage level of the reference low voltage. The switch SW5 is turned on in response to the low voltage level of the control signal VY1, and the switch SW6 is turned off. Therefore, the voltage level of the control signal VX1 is substantially equal to the low voltage level of the reference low voltage. The switch SW8 is turned on. The switch SW7 is turned off. Therefore, the voltage level of the control signal VY2 is substantially equal to the high voltage level of the reference high voltage VDD. The switch SW10 is turned on in response to the high voltage level of the control signal VY2. The switch SW9 is turned off. Therefore, the voltage level of the control signal VX2 is substantially equal to the high voltage level of the bias signal VB.

In the third mode, the transistor TA1 is turned off in response to the low voltage level of the control signal VY1. The transistor TA2 is turned off in response to the low voltage level of the control signal VX1. The transistor TA3 is turned on in response to the high voltage level of the control signal VY2. The transistor TA4 is turned on in response to the high voltage level of the control signal VX2.

In the fourth mode, both the transmission setting signal TRX and the enabling signal EN are at the second logic level (i.e., high logic "1"). The inverted enabling signal ENB has a first logic level (i.e., low logic "0"). The switch SW1 is turned on. The switch SW2 is turned off. Therefore, the voltage level of the bias signal VB is substantially equal to the reference low voltage level. The switch SW3 is turned on. The switch SW4 is turned off. Therefore, the voltage level of the control signal VY1 is substantially equal to the low voltage level of the reference low voltage. The switch SW5 is turned on in response to the low voltage level of the control signal VY1. The switch SW6 is turned off. Therefore, the voltage level of the control signal VX1 is substantially equal to the low voltage level of the reference low voltage. The switch SW8 is turned on. The switch SW7 is turned off. Therefore, the voltage level of the control signal VY2 is substantially equal to the high voltage level of the reference high voltage VDD. The switch SW10 is turned off because the bias signal VB is at a low voltage level. The switch SW9 is turned off. Therefore, the voltage level of the control signal VX2 is a low voltage level.

In the fourth mode, the transistor TA1 is turned off in response to the low voltage level of the control signal VY1. The transistor TA2 is turned off in response to the low voltage level of the control signal VX1. The transistor TA3 is turned on in response to the high voltage level of the control signal VY2. The transistor TA4 is turned off in response to the low voltage level of the control signal VX2.

It should be noted that when the enabling signal EN is at the first logic level, the transmission direction of the first transmission amplifier BDA1 depends on the logic level of the transmission setting signal TRX. When the enabling signal EN has the second logic level, the control signals VX1 and VX2 both have a low voltage level. Both the first cascode circuit structure and the second cascode circuit structure are turned off. Therefore, the first transmission amplifier BDA1 performs signal isolation.

Figure 7:
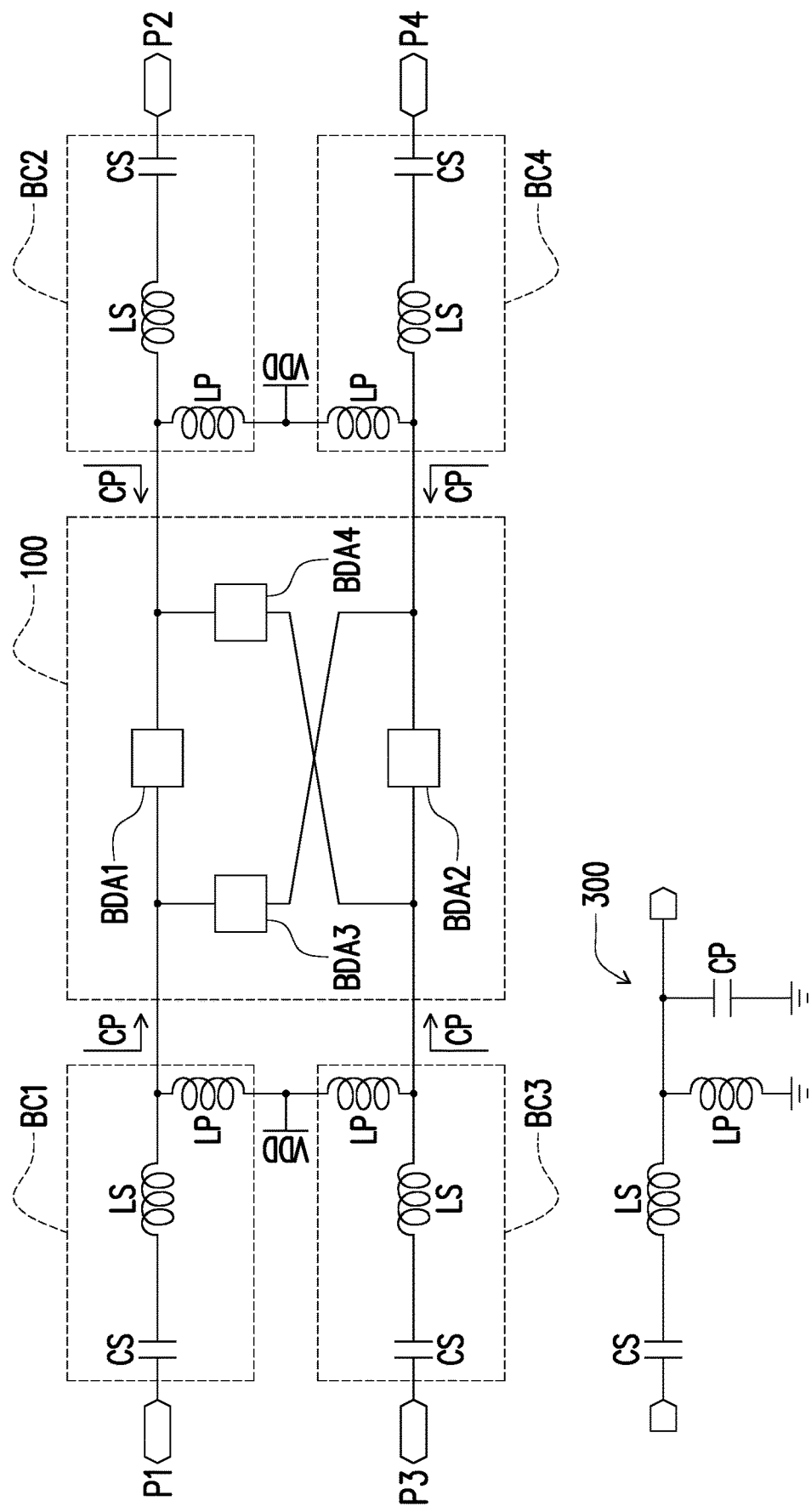
FIG. 7 is an application schematic diagram and an equivalent circuit diagram according to an embodiment of the disclosure.

Referring to FIG. 7, FIG. 7 is an application schematic diagram and an equivalent circuit diagram according to an embodiment of the disclosure. This embodiment shows an application example of the switching circuit 100. In this embodiment, the switching circuit 100 may be matched with the band-pass circuits BC1 to BC4. The band-pass circuit BC1 is coupled between the switching circuit 100 and the connection port P1. The band-pass circuit BC2 is coupled between the switching circuit 100 and the connection port P2. The band-pass circuit BC3 is coupled between the switching circuit 100 and the connection port P3. The band-pass circuit BC4 is coupled between the switching circuit 100 and the connection port P4.

Taking the band-pass circuit BC1 as an example, the band-pass circuit BC1 includes inductors LP and LS, and a capacitor CS (this disclosure is not limited thereto). The capacitor CS and the inductor LS are coupled in series between the switching circuit 100 and the connection port P1. The inductor LP is coupled between the switching circuit 100 and the reference high voltage VDD. The band-pass circuits BC1 to BC4 have the same and symmetrical circuit design as each other.

Based on the symmetrical design of the switching circuit 100 and the symmetrical circuit design of the band-pass circuits BC1 to BC4, this embodiment may provide the same equivalent circuit 300 in the multiple modes. Furthermore, the switching circuit 100 and the band-pass circuits BC2 and BC4 may be equivalent as a capacitor CP through the band-pass circuit BC1. The switching circuit 100 and the band-pass circuits BC1 and BC3 may be equivalent as the same capacitor CP through the band-pass circuit BC2. The switching circuit 100 and the band-pass circuits BC2 and BC4 may be equivalent as the same capacitor CP through the band-pass circuit BC3. The switching circuit 100 and the band-pass circuits BC1 and BC3 may be equivalent as the same capacitor CP through the band-pass circuit BC4.

Figure 8:
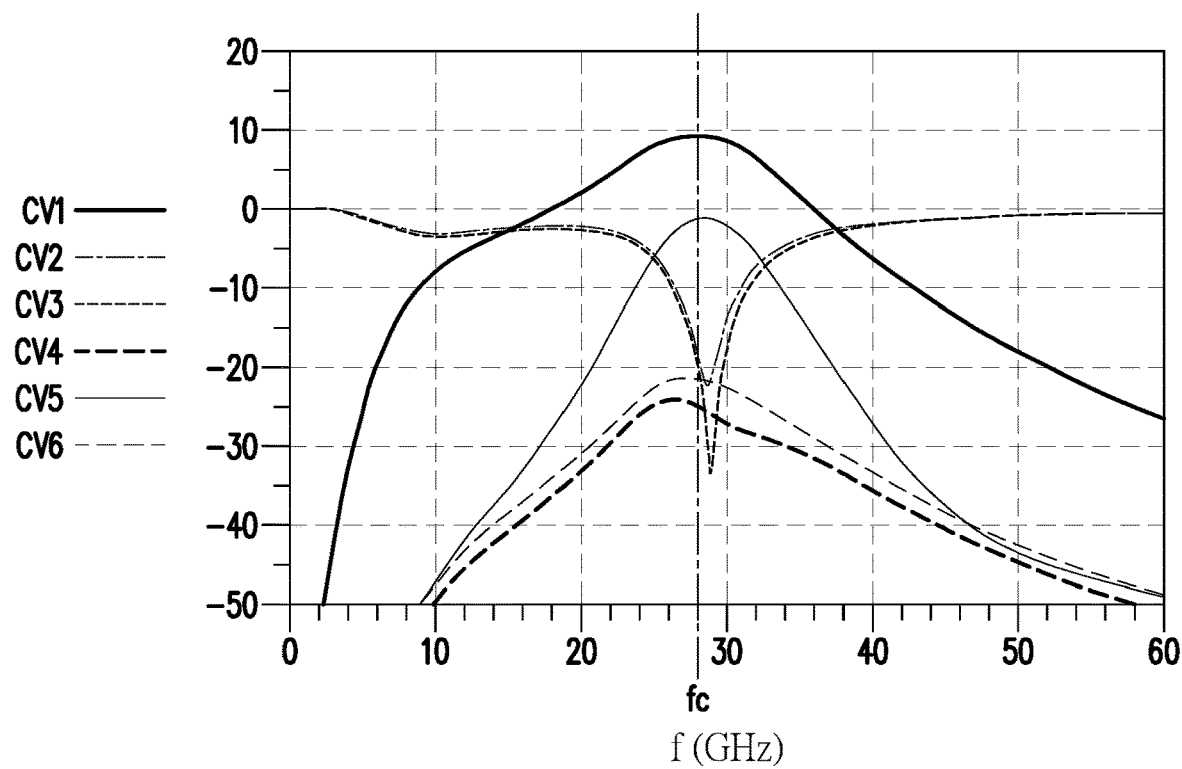
FIG. 8 is a simulation schematic diagram of a switching circuit operating in a first mode according to an embodiment of this disclosure.

Referring to FIG. 7 and FIG. 8 at the same time, FIG. 8 is a simulation schematic diagram of a switching circuit operating in a first mode according to an embodiment of this disclosure. In this embodiment, the band-pass circuits BC1 to BC4 are, for example, suitable for a central operating frequency fc of 28 GHz. The vertical axis of FIG. 8 is intensity. The unit of the vertical axis is dB. The horizontal axis of FIG. 8 is the frequency f. The unit of the horizontal axis in FIG. 8 is GHz. FIG. 8 shows curves CV1 to CV6. The curve CV1 represents the intensity spectrum of the first signal S1 transmitted from the connection port P1 to the connection port P2. The curve CV2 represents the reflection intensity spectrum of the connection port P1 itself. The curve CV3 represents the reflection intensity spectrum of the connection port P2 itself. The curve CV4 represents the intensity spectrum of the signal received by the connection port P1 from the connection port P2. The curve CV5 represents the intensity spectrum of the first signal S1 received by the connection port P4. The curve CV6 represents the intensity spectrum of the signal received by the connection port P1 from the connection port P4.

In this embodiment, in the frequency range (e.g., 24 to 32 GHz) close to the central operating frequency fc, the curves CV2 to CV3 have very low reflection intensity (e.g., lower than −10 dB), and the curves CV4 and CV5 represent the isolation level of reverse signals, with very low isolated signals (e.g., below −20 dB). The intensity of the curve CV5 is below 0 dB. The intensity of the curve CV5 is related to the intensity spectrum of the leakage path of the first signal S1 flowing through the first transmission amplifier BDA1, the fourth transmission amplifier BDA4, and the second transmission amplifier BDA2. It should be noted that the first transmission amplifier BDA1 and the second transmission amplifier BDA2 jointly provide two amplifications. However, the fourth transmission amplifier BDA4 performs signal isolation on the leakage path. Therefore, the intensity of the first signal S1 flowing through the leakage path may be reduced below 0 dB. The curve CV1 is related to the intensity spectrum of the first signal S1 flowing through the first transmission amplifier BDA1. The first transmission amplifier BDA1 provides an amplified signal for the first signal S1. Therefore, the intensity of the curve CV1 is significantly greater than the intensity of curves CV2 to CV6.

Figure 9:
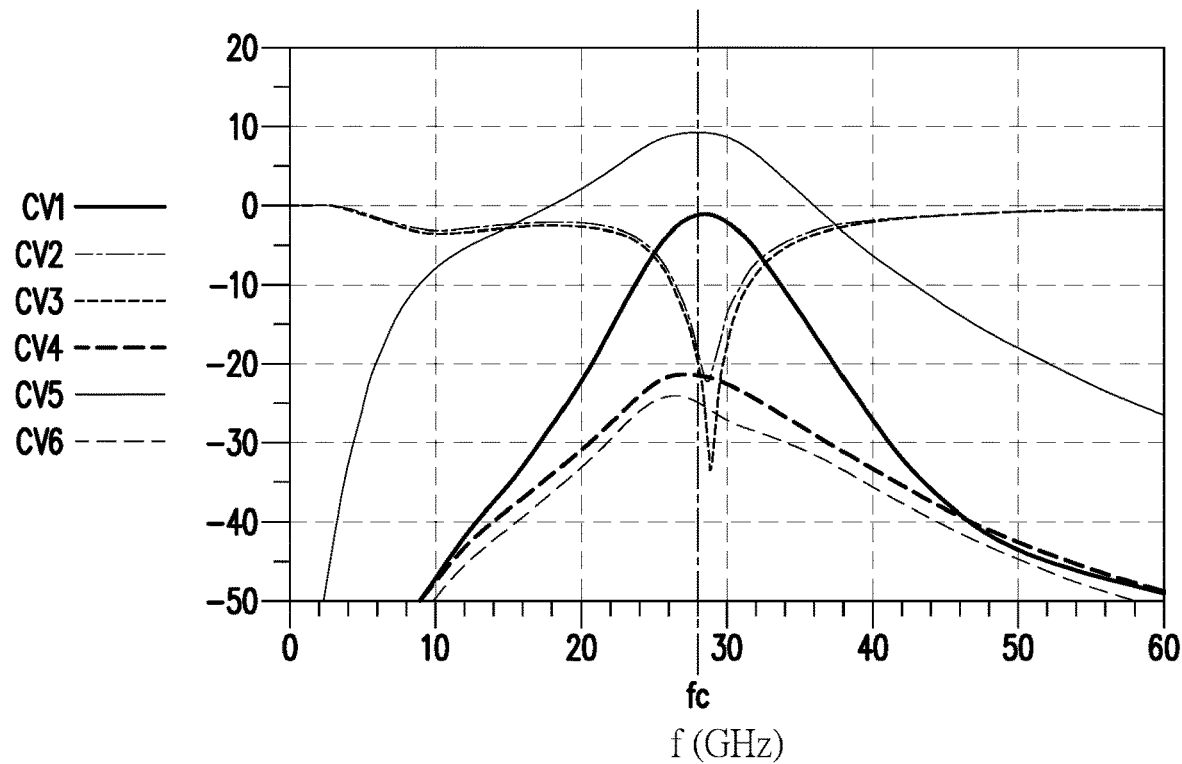
FIG. 9 is a simulation schematic diagram of a switching circuit operating in a second mode according to an embodiment of this disclosure.

Referring to FIG. 7 and FIG. 9 at the same time, FIG. 9 is a simulation schematic diagram of a switching circuit operating in a second mode according to an embodiment of this disclosure. The vertical axis of FIG. 9 is intensity. The unit of the vertical axis is dB. The horizontal axis of FIG. 9 is the frequency f. The unit of the horizontal axis in FIG. 9 is GHz. FIG. 9 shows curves CV1 to CV6. The curve CV1 represents the intensity spectrum of the first signal S1 transmitted from the connection port P1 to the connection port P2. The curve CV2 represents the reflection intensity spectrum of the connection port P1 itself. The curve CV3 represents the reflection intensity spectrum of the connection port P2 itself. The curve CV4 represents the intensity spectrum of the signal received by the connection port P1 from the connection port P2. The curve CV5 represents the intensity spectrum of the first signal S1 received by the connection port P4. The curve CV6 represents the intensity spectrum of the signal received by the connection port P1 from the connection port P4.

In this embodiment, the curve CV5 is related to the intensity spectrum of the first signal S1 flowing through the fourth transmission amplifier BDA4. The fourth transmission amplifier BDA4 provides an amplified signal for the first signal S1. Therefore, in the frequency range (e.g., 24 to 32 GHz) close to the central operating frequency fc, the intensity of the curve CV5 is obviously greater than the intensity of the curves CV1 to CV4, and CV6.

Figure 10:
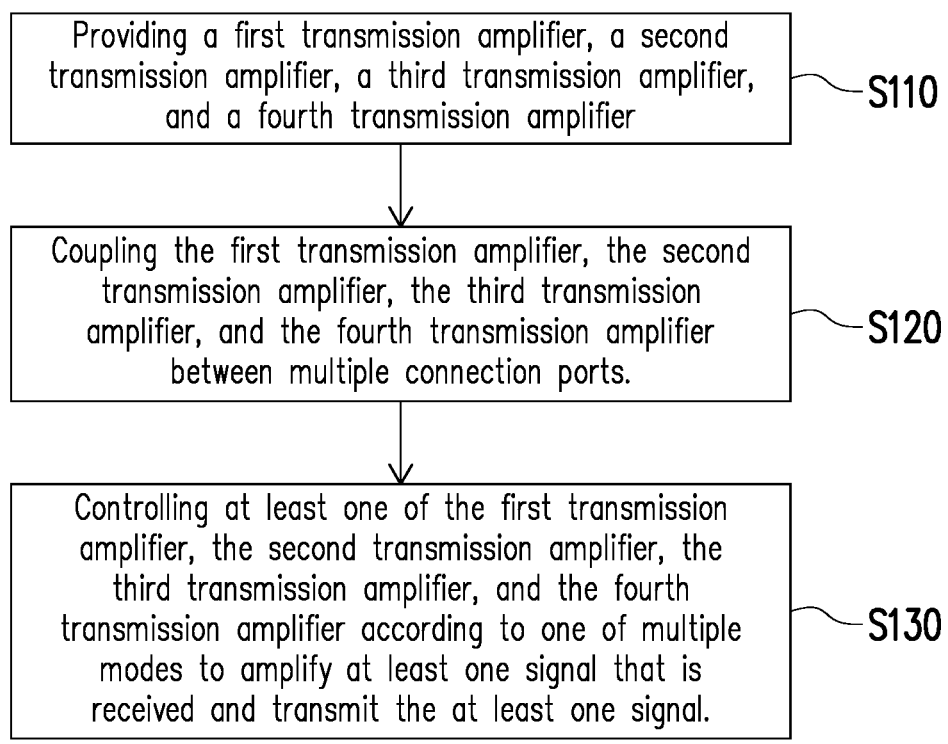
FIG. 10 is a schematic diagram of a method of providing a switching circuit according to an embodiment of the disclosure.

Referring to FIG. 1 and FIG. 10 at the same time, FIG. 10 is a schematic diagram of a method of providing a switching circuit according to an embodiment of the disclosure. In this embodiment, the method shown in FIG. 10 is, for example, suitable for providing a switching circuit 100. In step S110, a first transmission amplifier BDA1, a second transmission amplifier BDA2, a third transmission amplifier BDA3, and a fourth transmission amplifier BDA4 are provided.

In step S120, the first transmission amplifier BDA1, the second transmission amplifier BDA2, the third transmission amplifier BDA3, and the fourth transmission amplifier BDA4 are coupled between multiple connection ports. In this embodiment, the first transmission amplifier BDA1 is coupled between the connection port P1 and the connection port P2. The second transmission amplifier BDA2 is coupled between a connection port P3 and a connection port P4. The third transmission amplifier BDA3 is coupled between the connection port P1 and the connection port P4. The fourth transmission amplifier BDA4 is coupled between the connection port P2 and the connection port P3.

In step S130, a first transmission amplifier BDA1, a second transmission amplifier BDA2, a third transmission amplifier BDA3, and a fourth transmission amplifier BDA4 are controlled. Therefore, at least one of the first transmission amplifier BDA1, the second transmission amplifier BDA2, the third transmission amplifier BDA3, and the fourth transmission amplifier BDA4 amplifies the received at least one signal and transmits the at least one signal. In this embodiment, the first transmission amplifier BDA1, the second transmission amplifier BDA2, the third transmission amplifier BDA3, and the fourth transmission amplifier BDA4 are controlled to operate in one of the first mode, the second mode, the third mode, and the fourth mode. The implementation and operation of the first transmission amplifier BDA1, the second transmission amplifier BDA2, the third transmission amplifier BDA3, and the fourth transmission amplifier BDA4 have been clearly described in the embodiments shown in FIG. 1 to FIG. 6, so they are not repeated herein.

To sum up, the switching circuit may amplify multiple to-be-transmitted signals in different modes, thereby compensating the transmission loss of the switching circuit itself. In this way, the switching circuit has high signal-to-noise ratio. In addition, based on the symmetrical design of the switching circuit, the layout of the switching circuit is more simplified.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and their equivalents and not by the above detailed descriptions.

What is claimed is:
1. A switching circuit, comprising:
  a first transmission amplifier, coupled between a first connection port and a second connection port;
  a second transmission amplifier, coupled between a third connection port and a fourth connection port;
  a third transmission amplifier, coupled between the first connection port and the fourth connection port; and
  a fourth transmission amplifier, coupled between the second connection port and the third connection port,
  wherein in a first mode among a plurality of modes, the first transmission amplifier amplifies a first signal at the first connection port and transmits the first signal to the second connection port, and the second transmission amplifier amplifies a second signal at the third connection port and transmits the second signal to the fourth connection port, wherein in a second mode among the modes, the third transmission amplifier amplifies the first signal at the first connection port and transmits the first signal to the fourth connection port, and the fourth transmission amplifier amplifies the second signal at the third connection port and transmits the second signal to the second connection port.

2. The switching circuit according to claim 1, wherein in the first mode, the third transmission amplifier and the fourth transmission amplifier perform signal isolation.

3. The switching circuit according to claim 1, wherein in the second mode, the first transmission amplifier and the second transmission amplifier perform signal isolation.

4. The switching circuit according to claim 1, wherein in a third mode among the modes:
the first transmission amplifier amplifies a third signal at the second connection port and transmits the third signal to the first connection port,
the second transmission amplifier amplifies a fourth signal at the fourth connection port and transmits the fourth signal to the third connection port, and
the third transmission amplifier and the fourth transmission amplifier perform signal isolation.

5. The switching circuit according to claim 1, wherein in a fourth mode among the modes:
the fourth transmission amplifier amplifies a third signal at the second connection port and transmits the third signal to the third connection port,
the third transmission amplifier amplifies a fourth signal at the fourth connection port and transmits the fourth signal to the first connection port, and
the first transmission amplifier and the second transmission amplifier perform signal isolation.

6. The switching circuit according to claim 1, further comprising:
a controller, coupled to the first transmission amplifier, the second transmission amplifier, the third transmission amplifier, and the fourth transmission amplifier, configured to provide a plurality of control signals according to a transmission setting signal and an enabling signal to control the first transmission amplifier, the second transmission amplifier, the third transmission amplifier, and the fourth transmission amplifier to operate in one of the modes.

7. The switching circuit according to claim 6, wherein the controller is configured to:
in response to the transmission setting signal having a first logic level and the enabling signal having the first logic level, control the first transmission amplifier, the second transmission amplifier, the third transmission amplifier, and the fourth transmission amplifier to operate in the first mode,
in response to the transmission setting signal having the first logic level and the enabling signal having a second logic level, control the first transmission amplifier, the second transmission amplifier, the third transmission amplifier, and the fourth transmission amplifier to operate in the second mode,
in response to the transmission setting signal having the second logic level and the enabling signal having the first logic level, control the first transmission amplifier, the second transmission amplifier, the third transmission amplifier, and the fourth transmission amplifier to operate in the third mode among the modes,
in response to the transmission setting signal having the second logic level and the enabling signal having the second logic level, control the first transmission amplifier, the second transmission amplifier, the third transmission amplifier, and the fourth transmission amplifier to operate in the fourth mode among the modes.

8. The switching circuit according to claim 6, wherein the control signal comprises a first control signal, a second control signal, a third control signal, and a fourth control signal, wherein the first transmission amplifier comprises:
a first transistor, a first terminal of the first transistor coupling to the second connection port, a control terminal of the first transistor receiving the first control signal;
a first capacitor, coupling between the control terminal of the first transistor and a reference low voltage;
a second transistor, a first terminal of the second transistor coupling to a second terminal of the first transistor, a second terminal of the second transistor coupling to the reference low voltage, a control terminal of the second transistor receiving the second control signal;
a second capacitor, coupled between the control terminal of the second transistor and the first connection port;
a third transistor, a first terminal of the third transistor coupling to the first connection port, a control terminal of the third transistor receiving the third control signal;
a third capacitor, coupled between the control terminal of the third transistor and the reference low voltage;
a fourth transistor, a first terminal of the fourth transistor coupling to a second terminal of the third transistor, a second terminal of the fourth transistor coupling to the reference low voltage, a control terminal of the fourth transistor receiving the fourth control signal; and
a fourth capacitor, coupled between the control terminal of the fourth transistor and the second connection port.

9. The switching circuit according to claim 8, wherein:
in the first mode, the first transistor and the second transistor are turned on, the third transistor and the fourth transistor are turned off,
in a third mode among the modes, the third transistor and the fourth transistor are turned on, the first transistor and the second transistor are turned off, and
in the second mode and a fourth mode among the modes, the second transistor and the fourth transistor are turned off.

10. The switching circuit according to claim 8, wherein the controller comprises:
a first control circuit, coupled to the first transmission amplifier and the second transmission amplifier, configured to control the first transmission amplifier and the second transmission amplifier according to the transmission setting signal and an inverted enabling signal; and
a second control circuit, coupled to the third transmission amplifier and the fourth transmission amplifier, configured to control the third transmission amplifier and the fourth transmission amplifier according to the transmission setting signal and the enabling signal.

11. The switching circuit according to claim 10, wherein the first control circuit comprises:
a bias circuit, configured to receive the inverted enabling signal, provide a bias signal having a high voltage value in response to a first logic level of the inverted enabling signal, and provide the bias signal having a low voltage value in response to a second logic level of the inverted enabling signal;

a first control signal generator, configured to receive the transmission setting signal, generate the first control signal having the high voltage value in response to a first logic level of the transmission setting signal, and generate the first control signal having a low voltage value in response to a second logic level of the transmission setting signal;

a second control signal generator, coupled to the first control signal generator and the bias circuit, configured to set one of the bias signal and the reference low voltages as the second control signal in respond to a logic level of the first control signal;

a third control signal generator, configured to receive the transmission setting signal, generate the third control signal having the low voltage value in response to the first logic level of the transmission setting signal, and generate the third control signal having the high voltage value in respond to the second logic level of the transmission setting signal; and a fourth control signal generator, coupled to the third control signal generator and the bias circuit, configured to set one of the bias signal and the reference low voltage as the fourth control signal in respond to a logic level of the third control signal.

12. The switching circuit according to claim 6, wherein the control signals comprise a first control signal, a second control signal, a third control signal, and a fourth control signal, wherein the first connection port comprises a first differential signal terminal and a second differential signal terminal, wherein the second connection port comprises a third differential signal terminal and a fourth differential signal terminal, wherein the first transmission amplifier comprises:

a first transistor, a first terminal of the first transistor coupling to the third differential signal terminal, and a control terminal of the first transistor receiving the first control signal;

a first capacitor, coupled between the control terminal of the first transistor and a reference low voltage;

a second transistor, a first terminal of the second transistor coupling to a second terminal of the first transistor, a second terminal of the second transistor coupling to the reference low voltage, a control terminal of the second transistor receiving the second control signal;

a second capacitor, coupled between the control terminal of the second transistor and the first differential signal terminal;

a third transistor, a first terminal of the third transistor coupling to the fourth differential signal terminal, and a control terminal of the third transistor receiving the first control signal;

a fourth transistor, a first terminal of the fourth transistor coupling to a second terminal of the third transistor, a second terminal of the fourth transistor coupling to the reference low voltage, a control terminal of the fourth transistor receiving the second control signal;

a third capacitor, coupled between the control terminal of the fourth transistor and the second differential signal terminal;

a fifth transistor, a first terminal of the fifth transistor coupling to the first differential signal terminal, a control terminal of the fifth transistor receiving the third control signal;

a fourth capacitor, coupled between the control terminal of the fifth transistor and the reference low voltage;

a sixth transistor, a first terminal of the sixth transistor coupling to a second terminal of the fifth transistor, a second terminal of the sixth transistor coupling to the reference low voltage, a control terminal of the sixth transistor receiving the fourth control signal;

a fifth capacitor, coupled between the control terminal of the sixth transistor and the third differential signal terminal;

a seventh transistor, a first terminal of the seventh transistor coupling to the second differential signal terminal, a control terminal of the seventh transistor receiving the third control signal;

an eighth transistor, a first terminal of the eighth transistor coupling to a second terminal of the seventh transistor, a second terminal of the eighth transistor coupling to the reference low voltage, a control terminal of the eighth transistor receiving the fourth control signal; and a sixth capacitor, coupled between the control terminal of the eighth transistor and the fourth differential signal terminal.

13. The switching circuit according to claim 1, wherein:

a circuit layout of the first transmission amplifier and a circuit layout of the second transmission amplifier present line symmetry, and a circuit layout of the third transmission amplifier and a circuit layout of the fourth transmission amplifier present line symmetry.

14. A method of providing a switching circuit, comprising:

providing a first transmission amplifier, a second transmission amplifier, a third transmission amplifier, and a fourth transmission amplifier;

coupling the first transmission amplifier between a first connection port and a second connection port;

coupling the second transmission amplifier between a third connection port and a fourth connection port;

coupling the third transmission amplifier between the first connection port and the fourth connection port;

coupling the fourth transmission amplifier between the second connection port and the third connection port;

controlling at least one of the first transmission amplifier, the second transmission amplifier, the third transmission amplifier, and the fourth transmission amplifier according to one of a plurality of modes to amplify at least one signal that is received and transmit the at least one signal.

15. The method according to claim 14, wherein controlling the at least one of the first transmission amplifier, the second transmission amplifier, the third transmission amplifier, and the fourth transmission amplifier according to one of the modes to amplify the at least one signal that is received and to transmit the at least one signal comprises:

amplifying a first signal at the first connection port and transmitting the first signal to the second connection port by the first transmission amplifier, and amplifying a second signal at the third connection port and transmitting the second signal to the fourth connection port by the second transmission amplifier in a first mode among the modes, amplifying the first signal at the first connection port and transmitting the first signal to the fourth connection port by the third transmission amplifier, and amplifying the second signal at the third connection port and transmitting the second signal to the second connection port by the fourth transmission amplifier in a second mode among the modes.

16. The method according to claim 15, wherein controlling the at least one of the first transmission amplifier, the second transmission amplifier, the third transmission amplifier, and the fourth transmission amplifier according to one of the modes to amplify the at least one signal that is received and to transmit the at least one signal further comprises:
- performing signal isolation by the third transmission amplifier and the fourth transmission amplifier in the first mode; and
- performing signal isolation by the first transmission amplifier and the second transmission amplifier in the second mode.

17. The method according to claim 15, wherein controlling the at least one of the first transmission amplifier, the second transmission amplifier, the third transmission amplifier, and the fourth transmission amplifier according to one of the modes to amplify the at least one signal that is received and to transmit the at least one signal further comprises:
- in a third mode among the modes:
  - amplifying a third signal at the second connection port and transmitting the third signal to the first connection port by the first transmission amplifier;
  - amplifying a fourth signal at the fourth connection port and transmitting the fourth signal to the third connection port by the second transmission amplifier; and
  - performing signal isolation by the third transmission amplifier and the fourth transmission amplifier.

18. The method according to claim 15, wherein controlling the at least one of the first transmission amplifier, the second transmission amplifier, the third transmission amplifier, and the fourth transmission amplifier according to one of the modes to amplify the at least one signal that is received and to transmit the at least one signal further comprises:
- in a fourth mode among the modes:
  - amplifying a third signal at the second connection port and transmitting the third signal to the third connection port by the fourth transmission amplifier;
  - amplifying a fourth signal at the fourth connection port and transmitting the fourth signal to the first connection port by the fourth transmission amplifier; and
  - performing signal isolation by the first transmission amplifier and the second transmission amplifier.

19. The method according to claim 14, further comprising:
- providing a controller and coupling the controller to the first transmission amplifier, the second transmission amplifier, the third transmission amplifier, and the fourth transmission amplifier; and
- controlling the first transmission amplifier, the second transmission amplifier, the third transmission amplifier, and the fourth transmission amplifier to operate in one of the modes by providing a plurality of control signals by the controller according to a transmission setting signal and an enabling signal.

20. The method according to claim 19, wherein controlling the first transmission amplifier, the second transmission amplifier, the third transmission amplifier, and the fourth transmission amplifier to operate in one of the modes comprises:
- in response to the transmission setting signal having a first logic level and the enabling signal having the first logic level, controlling the first transmission amplifier, the second transmission amplifier, the third transmission amplifier, and the fourth transmission amplifier to operate in the first mode,
- in response to the transmission setting signal having the first logic level and the enabling signal having a second logic level, controlling the first transmission amplifier, the second transmission amplifier, the third transmission amplifier, and the fourth transmission amplifier to operate in the second mode,
- in response to the transmission setting signal having the second logic level and the enabling signal having the first logic level, controlling the first transmission amplifier, the second transmission amplifier, the third transmission amplifier, and the fourth transmission amplifier to operate in the third mode among the modes,
- in response to the transmission setting signal having the second logic level and the enabling signal having the second logic level, controlling the first transmission amplifier, the second transmission amplifier, the third transmission amplifier, and the fourth transmission amplifier to operate in the fourth mode among the modes.

* * * * *